(12) United States Patent
Pique Corchs et al.

(10) Patent No.: US 10,977,847 B2
(45) Date of Patent: Apr. 13, 2021

(54) ARCHITECTURE FOR AUGMENTING VIDEO DATA OBTAINED BY A CLIENT DEVICE WITH ONE OR MORE EFFECTS DURING RENDERING

(71) Applicant: Facebook, Inc., Menlo Park, CA (US)

(72) Inventors: Hermes Germi Pique Corchs, Menlo Park, CA (US); Kirill A. Pugin, Bellevue, WA (US); Razvan Gabriel Racasanu, Mountain View, CA (US); Colin Todd Miller, San Jose, CA (US); Ragavan Srinivasan, Cupertino, CA (US); Tomer Bar, San Francisco, CA (US); Bryce David Redd, Orem, UT (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/383,005

(22) Filed: Apr. 12, 2019

(65) Prior Publication Data

US 2019/0238610 A1 Aug. 1, 2019

Related U.S. Application Data

(63) Continuation of application No. 15/283,292, filed on Oct. 1, 2016, now Pat. No. 10,291,678.

(51) Int. Cl.
*G06T 11/60* (2006.01)
*H04L 29/06* (2006.01)
(Continued)

(52) U.S. Cl.
CPC .......... *G06T 11/60* (2013.01); *G06K 9/00288* (2013.01); *H04L 65/602* (2013.01);
(Continued)

(58) Field of Classification Search
None
See application file for complete search history.

(56) References Cited

U.S. PATENT DOCUMENTS

| 6,016,380 A | 1/2000 | Norton | |
|---|---|---|---|
| 2003/0197720 A1* | 10/2003 | Moon | H04N 21/234318 715/716 |

(Continued)

FOREIGN PATENT DOCUMENTS

| JP | 2005-130356 A | 5/2005 |
|---|---|---|
| JP | 2010-066844 A | 3/2010 |

(Continued)

OTHER PUBLICATIONS

PCT International Search Report and Written Opinion, PCT Application No. PCT/US2017/054197, dated Jan. 9, 2018, eighteen pages.

(Continued)

*Primary Examiner* — Jwalant Amin
(74) *Attorney, Agent, or Firm* — Fenwick & West LLP (57) ABSTRACT

A video effects application executes on a client device having an image capture device and receives video data captured by the image capture device. The video effects application extracts information from the captured video data and stores the extracted information as metadata associated with the captured video data. For example, the video effects application identifies objects in the captured video data or identifies optical flow of the captured video data and stores the identified objects or identified optical flow as metadata associated with the captured video data. The video effects application stores information describing modifications to the captured video data in association with the captured video data. When the captured video data is presented, the captured video data, associated metadata, and information describing the modifications is communicated (Continued)

to a renderer, which uses the metadata to perform the identified modifications to the captured video data when presenting the captured video data.

20 Claims, 5 Drawing Sheets (51) Int. Cl.
    *H04N 21/472* (2011.01)
    *H04N 21/414* (2011.01)
    *H04N 21/4223* (2011.01)
    *H04N 21/44* (2011.01)
    *H04N 21/658* (2011.01)
    *H04N 21/81* (2011.01)
    *G06K 9/00* (2006.01)

(52) U.S. Cl.
    CPC .......... *H04L 65/604* (2013.01); *H04L 65/605* (2013.01); *H04L 65/607* (2013.01); *H04N 21/41407* (2013.01); *H04N 21/4223* (2013.01); *H04N 21/44008* (2013.01); *H04N 21/47205* (2013.01); *H04N 21/6582* (2013.01); *H04N 21/8133* (2013.01); *G06K 9/00221* (2013.01); *G06T 2207/30201* (2013.01)

(56) References Cited

U.S. PATENT DOCUMENTS

| | | |
|---|---|---|
| 2004/0001690 A1 | 1/2004 | Boston et al. |
| 2004/0133924 A1 | 7/2004 | Wilkins et al. |
| 2007/0101387 A1 | 5/2007 | Hua et al. |
| 2007/0162568 A1 | 7/2007 | Gupta et al. |
| 2013/0332836 A1* | 12/2013 | Cho ..................... G11B 27/031 |
| | | 715/723 |
| 2014/0359656 A1 | 12/2014 | Banica et al. |
| 2015/0213625 A1 | 7/2015 | Berger et al. |
| 2015/0302894 A1 | 10/2015 | Boiman et al. |
| 2015/0371422 A1 | 12/2015 | Kokemohr |
| 2018/0011627 A1* | 1/2018 | Siracusano, Jr. ... H04L 12/1813 |
| 2018/0255346 A1* | 9/2018 | Guo ................... H04N 21/4316 |

FOREIGN PATENT DOCUMENTS

| | | |
|---|---|---|
| JP | 2012-135039 A | 7/2012 |
| KR | 10-2008-0060235 A | 7/2008 |
| WO | WO 2007/053627 A1 | 5/2007 |
| WO | WO 2011/149698 A1 | 12/2011 |
| WO | WO 2013/126854 A1 | 8/2013 |
| WO | WO 2017/077751 A | 5/2017 |

OTHER PUBLICATIONS

Japanese Office Action, Japanese Application No. 2019-516425, dated Aug. 6, 2019, 5 pages.
Korean Intellectual Property Office, Office Action, Korean Patent Application No. 10-2019-7009682, dated Apr. 23, 2020, 13 pages.

* cited by examiner

ARCHITECTURE FOR AUGMENTING VIDEO DATA OBTAINED BY A CLIENT DEVICE WITH ONE OR MORE EFFECTS DURING RENDERING

CROSS REFERENCE TO RELATED APPLICATIONS

This application claims the benefit of U.S. patent application Ser. No. 15/283,292 filed on Oct. 1, 2016, which is incorporated herein by reference in its entirety.

BACKGROUND

This disclosure relates generally to obtaining video data by a client device, and more specifically to an architecture for augmenting the video data obtained by the client device with additional content when the obtained video data is rendered.

Users of client devices increasingly capture video data via image capture devices included in various client devices and share the captured video with other users. For example, through an application associated with an online system executing on a client device, a user of the client device distributes video data captured via the client device, or otherwise obtained via the client device, to other users of the online system. To encourage user engagement, many applications allow a user of the client device to modify video data obtained by the client device and subsequently present the modified video data.

For example, various applications allow users to apply filters to video data obtained by a client device or to overlay text or images onto portions of video data obtained by the client device. However, conventional applications for modifying video data receive modifications to the video data and extract information from the video data to perform the modifications when the video data is rendered. For example, to overlay images on a face detected in the video data, a conventional application applies one or more detection methods to the video data while the video data is rendered and modifies the video data by overlaying the images on regions of the video data from which faces are detected. As methods for extracting information from video data are computationally intensive, extracting the information while rendering the video data and performing the modifications may more rapidly drain resources of a client device, such as power stored in a battery or other power supply of the client device.

SUMMARY

A client device, such as a smartphone or a tablet computer, includes an image capture device configured to capture video data. A video effects application executing on the client device receives the captured video data and augments the captured data or modifies the video data when the captured video data is presented by a display device of the client device. For example, the video effects application overlays additional images or text on the captured video data when presenting the captured video data. The video effects application may augment or otherwise modify the video data when is the video data captured, or may modify the video data at a time subsequent to a time when the video data was captured.

To perform various modifications to the video data, the video effects application often extracts information from the captured video data and uses the extracted information to modify the captured video data. For example, the video effects application detected one or more faces in the captured video data and applies text or images to the video data based on locations of the detected faces in various frames of the captured video data. To more efficiently use a battery of the client device, the video effects application extracts information from the captured video data and stores the extracted information as metadata associated with the captured video data. In various embodiments, the video effects application provides the captured video data and metadata associated with the captured video data to an online system, allowing the online system to subsequently provide the captured video data and associated metadata to other client devices for rendering. For example, a user of the client device captures video via the client device and provides instructions to the video effects application to communicate the captured video and associated metadata to the online system; the user may also specify one or more other users of the online system to receive the captured video data and associated metadata to the online system, and the online system communicates the captured video data and associated metadata to client devices associated with the other users. The video effects application also stores information identifying modifications to the captured video data to be performed when rendering the captured video data. For example, information identifying one or more modifications to the captured video data is stored in association with times of the captured video data when the modifications are to be performed. The information describing the one or more modifications may also be provided to the online system, which may subsequently provide the information describing the one or more modifications to client devices associated with other users along with the captured video data and metadata associated with the captured video data.

When the captured video data is subsequently rendered for presentation, the video effects application provides the captured video data, the metadata associated with the captured video data, and the information identifying the one or more modifications to the captured video data to the renderer. Based on the metadata associated with the captured video data and the identified one or more modifications to the captured video data, the renderer performs the one or more modifications to the captured video data when the captured video data is rendered for display. For example, the renderer overlays text or graphics on one or more frames of the captured video data corresponding to one or more identified times of the video data based on locations within the one or more frames of detected faces or other objects included in the metadata associated with the captured video data.

If the captured video data and associated metadata is communicated to the online system, the online system may communicate the captured video data and associated metadata to an additional client device associated with another user of the online system. The other user of the online system may provide information describing one or more modifications to a video effects application or to a renderer of the additional client device, causing the renderer or video effects application of the additional client device to perform the described modifications to the captured video data using the metadata associated with the captured video data and present the modified captured video data to the other user of the client device. Using the metadata associated with the captured video data to perform the modifications to the captured video data without the renderer or the video effects application of the additional client device also extracting information from the captured video data, conserving computing and power resources of the additional client device.

Separately extracting information from the captured video data and performing the modifications to the video data allows the client device to more efficiently use its battery. As methods for extracting information from the captured video data are computationally intensive, extracting information from the captured video data and storing the extracted information as metadata associated with the captured video data allows the metadata associated with the captured video data to be provided to another client device along with the captured video data, allowing the other client device to leverage the metadata associated with the captured video data when modifying the video data during presentation rather than again extracting the information from the captured video data to modify the captured video data during presentation. Additionally, storing information extracted from the captured video data and using the stored information to modify the captured video data during presentation allows presentation of higher-quality modified captured video data. For example, using stored information extracted from the captured video data to modify the captured video data allows the modifications to the captured video data to be free of compression artifacts from compressing the captured video data. Further, modifying the captured video data based on stored information extracted from the captured video data may allow the video effects application to perform more complex modifications to the captured video data than if information were extracted from the captured video data while the captured video data is modified.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
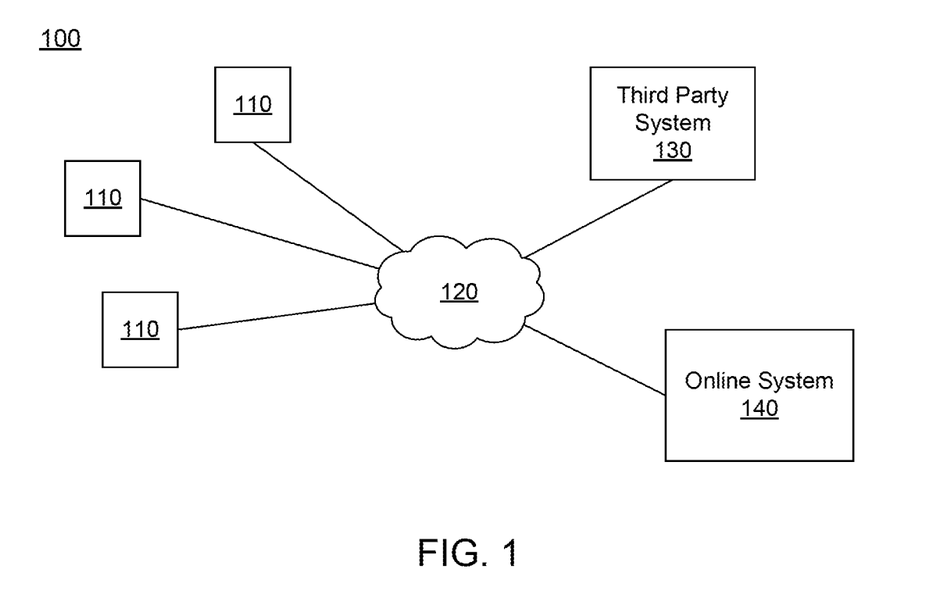
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, a messaging server, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

As further described below in conjunction with FIG. 3, in various embodiments a client device 110 includes an image capture device capable of capturing video data and an application for modifying the captured video data. For example, an application executing on the client device 110 allows a user of the client device 110 to overlay images or text onto portions of video data captured by an image capture device or otherwise obtained by the client device 110. In some embodiments, the application for modifying the video data provides additional functionality. For example, the application also allows a user to exchange content (e.g., messages) with other users of the online system 140. Alternatively, an additional application allows the user to communicate with users of the online system 140 and the additional application obtains the modified video data from the application that modified the video data. To modify obtained video data while conserving resources (e.g., power supply resources), the application extracts information from the video data when the video data is obtained and stores metadata describing the extracted information in association with the video data. After receiving information describing one or more modifications to the video data, the application (or another application) uses the metadata associated with the video data to perform the described one or more modifications. This allows the video data to be modified without extracting information from the video data when the video data is received and again when the video data is modified. An example client device 110 is further described below in conjunction with FIG. 3, while extraction of information from video data and modification of the video data is further described below in conjunction with FIGS. 4 and 5.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content.

Figure 2:
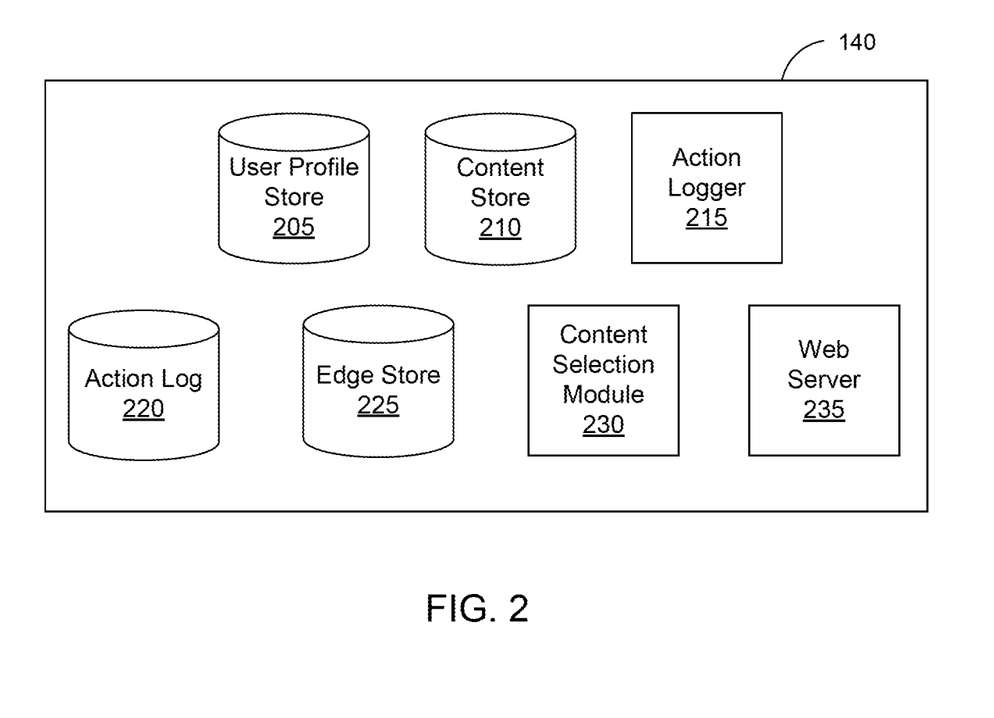
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, the content store 210 includes video data captured by a client device 110 and metadata associated with the video data by the client device 110. As further described below in conjunction with FIGS. 3-5, a client device 110 extracts information from the captured video data and stores the metadata in association with the captured video data. The client device 110 may communicate the video data and associated metadata to the online system 140, which stores the video data and associated metadata in the content store 210. In various embodiments, the online system 140 receives information identifying a user of the online system 140 along with the video data and associated metadata and stores the information identifying the user in association with the video data and with the metadata associated with the video data. As further described below in conjunction with FIG. 4, the online system 140 may retrieve video data and metadata associated with the video data from the content store 205 and provide the video data and associated metadata to client devices 110 associated with other users of the online system 140 in response to receiving a request from the user who provided the video data to the online system 140 to provide the video data to other users.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Client Device Architecture

Figure 3:
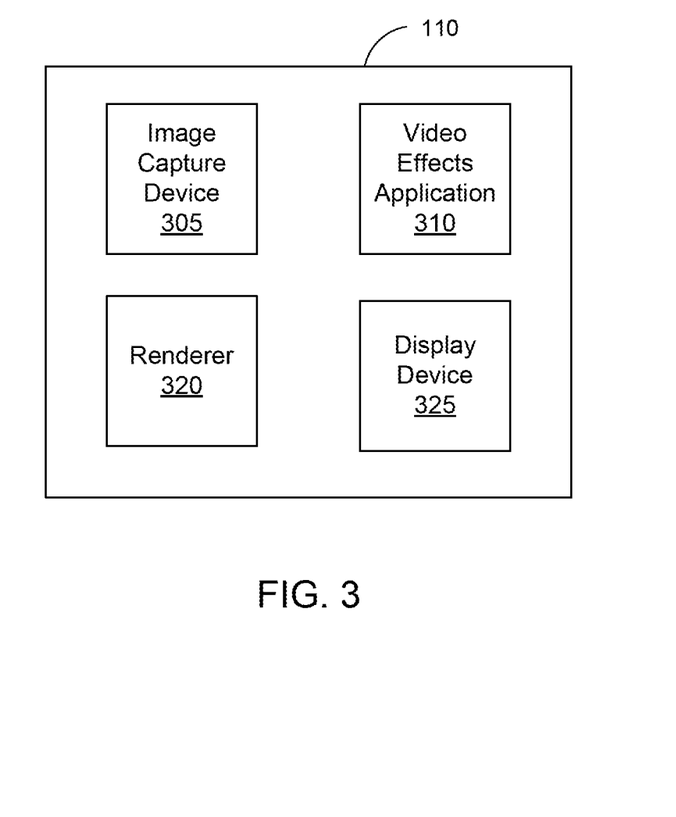
FIG. 3 is a block diagram of a client device, in accordance with an embodiment.

FIG. 3 is a block diagram of one embodiment of an architecture of a client device 110. The client device 110 shown in FIG. 3 includes an image capture device 305, a video effects application 310, a renderer 315, and a display device 320. In other embodiments, the client device 110 may include additional, fewer, or different components for various applications. Further, various components of the client device 110 may provide various combinations of the functionality further described below in some embodiments.

The image capture device 305 is any device capable of capturing image or video data. Example image capture devices 305 include one or more cameras, one or more video cameras, or any other device capable of capturing image data. In some embodiments, the image capture device 305 includes one or more filters. Similarly, the image capture device 305 may include optics for altering light used to generate image or video data in various embodiments. Different client devices 110 may have image capture devices 305 having different characteristics (e.g., resolution of captured image data, shutter control, frame rates, focal lengths, diameter of an entrance pupil capturing light for generating video or image data). While FIG. 3 shows a client device 110 having a single image capture device 305, in various embodiments, client devices 110 may include multiple image capture devices 305.

The video effects application 310 comprises instructions that, when executed by a processor of the client device 110, extracts information from video data received from the image capture device 305 or from any other suitable source. To extract information from video data, the video effects application 310 may apply one or more methods to the video data, with various methods extracting different information from the video data. For example, one or more methods applied by the video effects application 310 detect objects, such as faces, from various frames of the video data. As another example, one or more methods applied by the video effects application 310 determine optical flow vectors describing movement of objects or other components of the video data based on various frames of the video data. In various embodiments, the video effects application 310 may extract any suitable information from video data. In other examples, information extracted from video data tracks one or more objects across various frames of the video data (e.g., through application of one or more particle filters to the video data) or identifies changes in one or more objects detected in the video data (e.g., a change in expression of a face detected in the video data). Additionally, information extracted from video data by the video effects application 310 may be determined based on settings specified by a user of the client device 110, based on information specified by the video effects application 310, information specified by another application executing on the client device 110, or based on information from any other suitable source. This allows customization of information extracted from video data by the video effects application in various implementations. As further described below in conjunction with FIG. 4, the video effects application 310 stores information extracted from video data as metadata associated with the video data.

Additionally, the video effects application 310 receives information identifying modifications to video data. Information identifying modifications to video data may be received from a user, received from another application, received from an online system 140, or received from a third party system 130. Examples of modifications to video data identified to video effects application 310 include application of one or more filters to the video data, overlying text on one or more portions of the video data, overlaying images on one or more portions of the video data, altering a playback speed of the video data, modifying audio included in one or more portions of the video data, identifying movement of objects in the video data, modifying shading or coloring of one or more frames of the video data, tracking objects within the video data (e.g., application of particle filters), identifying changes in one or more objects in the video data (e.g., identifying a change) and any other suitable modification. One or more modifications to the video data may identify data obtained by the client device 110 when the video data is presentation that affects how the video data is modified; for example, a modification to the video data identifies one or more inputs received by the client device 110 when the video data is presented and instructions for altering image or text data overlaid on the video data based on the received one or more inputs. In other examples, data from an accelerometer of a client device 110, from a position sensor of the client device 110, from a microphone of the client device 110, or from any other suitable component of the client device 110 may be identified and used to determine how the video data is modified when presented by the client device 110. Additionally, information identifying modifications to video data may specify one or more characteristics of the metadata associated with the video data for performing a modification; for example, information describing a modification to the video data may specify a threshold measure of similarity to a particular object so an identified modification is performed if an object identified by the metadata has at least the threshold measure of similarity to the particular object, but the identified modification is not performed if the object identified by the metadata has less than the threshold measure of similarity to the particular object. Different modifications to video data may be identified to the video effects application 310 in various embodiments, so different implementations of the video effects application 310 may identify different modifications to video data. As further described below in conjunction with FIG. 4, the video effects application 310 stores information identifying one or more modifications to the video data in association with the video data.

The renderer 315 receives video data, the metadata associated with the video data, and information describing modifications to the video data from the video effects application 110. For purposes of illustration, FIG. 3 shows the renderer 315 as separate from the video effects application 310; however, in various embodiments, the renderer 315 and the video effects application 310 may be combined into a single component. As further described below in conjunction with FIG. 4, when rendering the video data, the renderer 315 modifies the video data by performing the modifications described by the information and renders the modified video data. To perform one or more of the modifications to the video data, the renderer 315 accesses the metadata and uses information extracted from the video data and described by the metadata. For example, if a modification to the video data identifies an image to overlay on an object in the video data (e.g., a face in the video data), the renderer 315 identifies frames of the video data including the object from the metadata and locations within the identified frames having the object and overlays the image on the locations within the identified frames that have the object. Hence, the renderer 315 leverages the metadata describing information extracted from the video data to subsequently modify the video data without again extracting information from the video data.

The display device 320 included in the client device 110 presents image data or video data to a user of the client device 110. Examples of the display device 320 include a liquid crystal display (LCD), an organic light emitting diode (OLED) display, an active matrix liquid crystal display (AMLCD), or any other suitable device. Different client devices 110 may have display devices 320 with different characteristics. For example, different client devices 320 have display devices 320 with different display areas, different resolutions, or differences in other characteristics.

Figure 4:
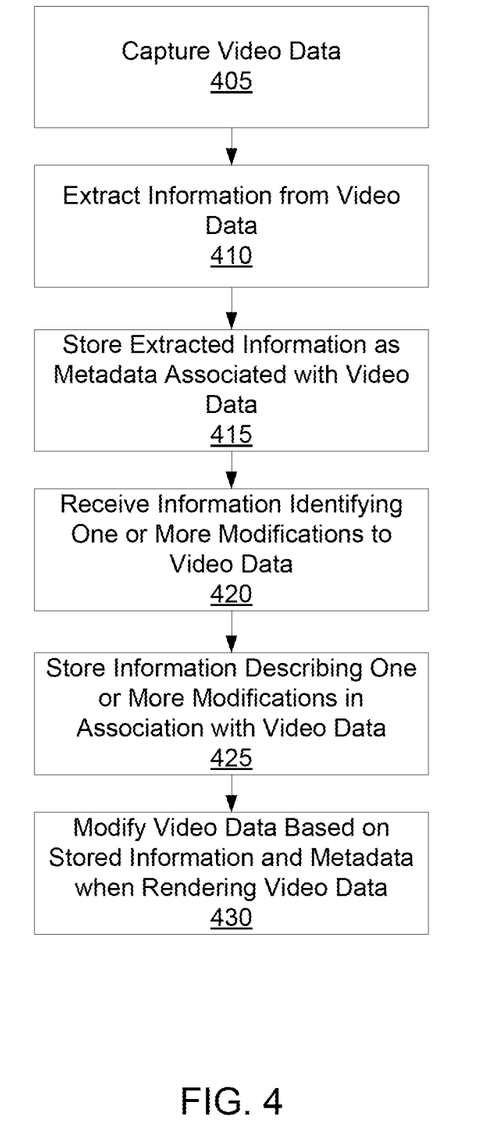
FIG. 4 is a flowchart of flowchart a method for modifying video data obtained by a client device, in accordance with an embodiment.

Modifying Video Data Obtained by a Client Device Based on Information Extracted from the Video Data FIG. 4 is a flowchart of one embodiment of a method for modifying video data obtained by a client device 110. In other embodiments, the method may include different and/or additional steps than those shown in FIG. 4. Additionally, steps of the method may be performed in different orders than the order described in conjunction with FIG. 4 in various embodiments.

An image capture device 305 included in a client device 110 captures 405 video data. For example, a camera included in the client device 110 captures 405 video data. In various embodiments, the video data captured 405 by the image capture device 305 has any suitable resolution or any other suitable characteristics. In other embodiments, the client device 110 may capture 405 video data from any suitable source. For example, video data captured by the client device 110 is video data that the client device 110 receives from an online system 140, from a third party system 130, from another client device 110, or from any other suitable source.

A video effects application 310 executing on the client device 110 receives the video data captured 405 by the image capture device 305 of the client device 110 and extracts 410 information from the captured video data. The video effects application 310 extracts 410 any suitable information from the captured video data in various embodiments. To extract 410 information from the captured video data and using the extracted information to modify the captured video data. For example, the video effects application 310 applies one or more processes to the captured video data to detect objects, such as faces, included in the captured video data; the video effects application 310 may identify locations within one or more frames of the video data of the detected objects. As another example, the video effects application 310 applies one or more processes to the captured video data to determine optical flow vectors describing motion of objects, or any other suitable component, in the captured video data. In various embodiments, the video effects application 310 may extract 410 any suitable characteristics of or information about the captured video data.

The video effects application 310 stores 415 the information extracted 410 from the captured video data as metadata associated with the captured video data. In various embodiments, the extracted information may be stored 415 in any suitable format in association with the captured video data. For example, if the extracted information includes objects detected in the captured video data, metadata stored 415 in association with the captured video data includes times within the video data where various objects, or identifiers of frames of the video data where the various objects, were detected along with identifiers of the detected objects; locations within various frames where objects were detected may also be included in the stored metadata. As another example, optical flow vectors determined from various frames are stored 415 in association with identifiers of frames of the captured video data from which the optical flow vectors were determined.

The video effects application 310 communicates the captured video data and the metadata associated with the captured video data to an online system 140 in some embodiments. The online system 140 stores the captured video data from the client device 110 and the metadata associated with the captured video data in some embodiments. For example, the video effects application 310 executing on the client device 110 communicates information identifying a user of the online system 140 associated with the client device 110 in association with the captured video data and the metadata associated with the captured video data to the online system 140, which stores the captured video data and associated metadata in association with the user. As another example, the client device 110 communicates identifiers of additional users of the online system 140, the captured video data, and the metadata associated with the captured video data to the online system 140, which communicates the captured video data and metadata associated with the captured video data to additional client devices 110 associated with the additional users corresponding to the identifiers.

Additionally, the video effects application 310 receives 420 information identifying one or more modifications to the captured video data and stores 425 the received information identifying modifications to the captured video data in association with the captured video data. For example, the video effects application 310 receives 420 an identifier of a filter to apply to the captured video data from a user along with identifiers of one or more portions (e.g., identifiers of frames, time intervals) of the captured video data to which the filter is applied and stores 425 the identifier of the filter and identifiers of the one or more portions of the captured video data to which the filter is applied in association with the captured video data. As another example, the video effects application 310 receives 420 text or image data to overlay on one or more portions of the captured data and stores 425 the text or image data in association with identifiers of the one or more portions (e.g., identifiers of frames, time intervals) of the captured video data to where the text or image data is overlaid. The received 420 information may identify objects detected from the captured video data over which text or image data is overlaid in some embodiments. In some embodiments, the information identifying modifications to the captured video data is communicated from the client device 110 to the online system 140. For example, the online system 140 receives information identifying a user of the online system 140 along with the information identifying modifications to the captured video data, and the online system 140 stores the information identifying the modifications in association with the user and with the captured video data and metadata associated with the captured video data. As another example, the online system 140 receives identifiers of additional users from the client device 110 along with the information identifying modifications to the captured video data, and the online system 140 communicates the captured video data, the metadata associated with the captured video data, and the information identifying modifications to the captured video data to additional client devices 110 associated with the additional users.

To modify the captured data based on the stored 425 information identifying the one or more modifications, when the captured video data is subsequently presented, the video effects application 305 provides the captured video data, the metadata associated with the captured video data, and the information identifying one or more modifications to the captured video data to a renderer 315. In some embodiments, the renderer 315 is a component of the video effects application 310. Alternatively, the renderer 315 is a separate component of the client device 110; for example, the renderer 315 is a separate application executing on the client device 110 or is a hardware or firmware component of the client device 110. When the captured video data is presented or stored, the renderer 315 modifies 430 the captured video data based on the identified one or more modifications and the metadata associated with the captured video data. For example, information associated with the captured video data identifies a portion of the captured video data where text or an image is overlaid, so the renderer 315 overlays the text or the image on the identified portion of the captured video data when the identified portion of the captured video data is rendered for presentation by a display device 320 of the client device 110 or is rendered for storage by the client device 110 or by an online system 140 or a third party system 130. If an identified modification to the captured video data identifies an object within the video data that is to be modified, the renderer 315 identifies portions of the video data including the identified object from the metadata associated with the captured video data and modifies the object as specified by the information when the portions of the video data including the identified object are presented. Hence, the renderer 315 uses the metadata associated with the captured video data to identify portions of the captured video data that are modified based on the stored information and to modify the identified portions of the captured video data when rendering the captured video data for presentation.

Storing metadata describing information extracted 410 from captured video data in association with the captured video data and subsequently leveraging the metadata associated with the captured video data to modify 430 the captured video data when it is presented or stored allows the client device 110 to more efficiently consume power, allowing the client device 110 to reduce draw from a battery or other power supply when modifying the captured video data. As methods for extracting 410 information from the captured video data are computationally intensive, extracting 410 information from the captured video data and storing 415 the extracted information as metadata associated with the captured video data allows subsequent modification of the captured video data by another client device 110 that receives the captured video data to leverage the metadata associated with the captured video data to modify the captured video data when rendering modified captured video data rather than again extracting the information from the captured video data after receiving the captured video data from the client device 110 or from the online system 140. Additionally, storing 415 information extracted from the captured video data and using the stored information to modify 430 the captured video data during presentation or storage increases a quality of the modifications to the captured video data. For example, modifying 430 captured video data using stored metadata associated with the captured video data allows modifications to the captured video data to be free of artifacts from compressing the captured video data.

Further, modifying 430 the captured video data based on stored metadata describing information extracted from the captured video data may allow more complex modifications of the captured video data than if information were extracted from the captured video data while the captured video data is modified. For example, modifying 430 the captured video data based on metadata associated with the captured video data allows one or more modifications to the captured video data to account for data obtained by a client device 110 when the modified captured video data is presented. As an example, a client device 110 modifying 430 the captured video data differently modifies the video data based on different inputs from a user of the client device 110 (e.g., interactions with an input device of the client device 110 when the captured video data is presented) or based on different information captured by one or more components of the client device 110 (e.g., accelerometers, position sensors, etc.) while the client device 110 presents the captured video data. Hence, if the captured video data, metadata associated with the captured video data, and information identifying modifications to the captured video data are provided to additional client devices 110, different additional client devices 110 may differently perform one or more modifications to the captured video data during presentation based on differences in data obtained by different additional client devices 110 during presentation of the captured video data. Additionally, modifying 430 the captured video data using metadata associated with the captured video data allows multiple modifications to portions of the captured video data based on metadata associated with portions of the captured video data. For example, if metadata associated with the captured video data identifies portions of the video data including a particular object or changes to the particular object, one or more images are overlaid onto the identified portions of the captured video data and audio of the captured video data is modified during the identified portions. Using the metadata associated with the captured video data simplifies performance of multiple modifications to various portions of the captured video data based on characteristics or content of the various portions of the captured video data.

While FIG. 4 describes extraction of information from video data captured 405 by an image capture device 305 of a client device, the method described above in conjunction with FIG. 4 may be applied to video data obtained by the client device 110 from any suitable source. For example, the client device 110 receives video data from another client device 110, from an online system 140, or from a third party system 130, and the video effects application 310 extracts 410 information from the video data and stores 415 the extracted information as metadata associated with the video data, as further described above. The video effects application 310 receives 420 information describing one or more modifications to the video data and stores 425 the received information in association with the video data. When the video data is subsequently presented or stored, the renderer modifies the video data as specified by the received information based on the metadata associated with the video data, as further described above. Hence, video data obtained by the client device 110 from the image capture device 305 or obtained from any suitable source may be modified as described above in conjunction with FIG. 4.

Figure 5:
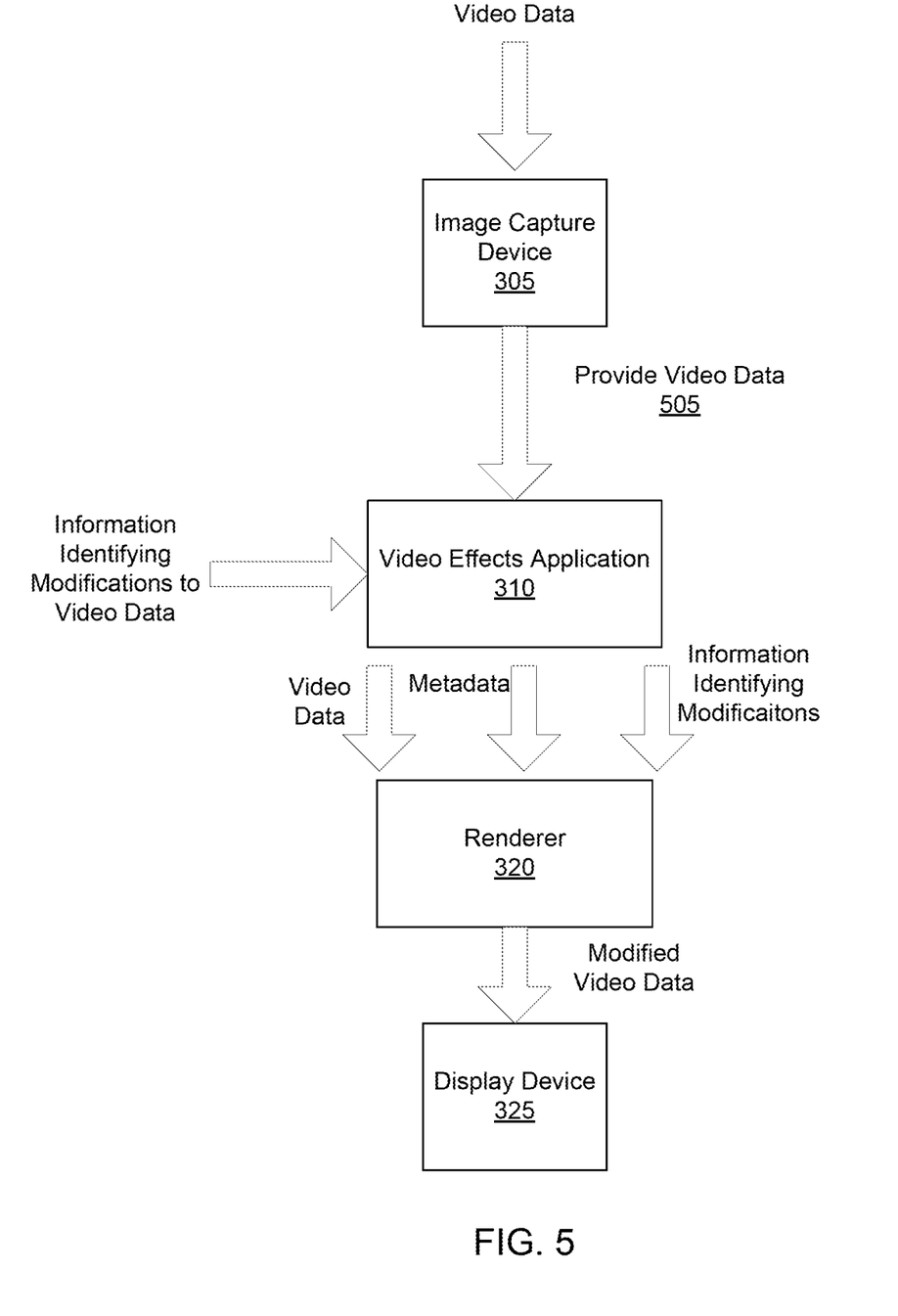
FIG. 5 is a process flow diagram of an architecture for modifying video data obtained by a client device, in accordance with an embodiment.

FIG. 5 is a process flow diagram of one embodiment of an architecture for modifying video data obtained by a client device 110. In the example of FIG. 5, an image capture device 305 of a client device 110 captures video data and provides 505 the captured video data to a video effects application 310 executing on the client device 110. As further described above in conjunction with FIG. 4, the video effects application 310 extracts information from the captured video data and stores the extracted information as metadata associated with the captured video data. Additionally, the video effects application 310 receives information identifying one or more modifications to the captured video data and stores the received information identifying modifications to the captured video data in association with the captured video data, as further described above in conjunction with FIG. 4. The video effects application 310 provides the captured video data, the metadata associated with the captured video data, and the information identifying modifications to the captured video data to a renderer 315.

The renderer 315 modifies the captured video data by performing the modifications specified by the received information to portions of the captured video data identified by the received information. When modifying the captured video data, the renderer 315 accesses the metadata associated with the captured video data and uses the information extracted from the captured video data and described by the metadata to perform one or more of the modifications. The renderer 315 provides the modified captured video data to a display device 320 of the client device 110 for presentation or to a storage device included in the client device 110 for storage. Hence, the architecture described in conjunction with FIG. 5 separates extraction of information from the captured video data from modification of the captured video data based on the extracted information, allowing modification of the captured video data to reduce power consumption by the client device 110.

Figure 6:
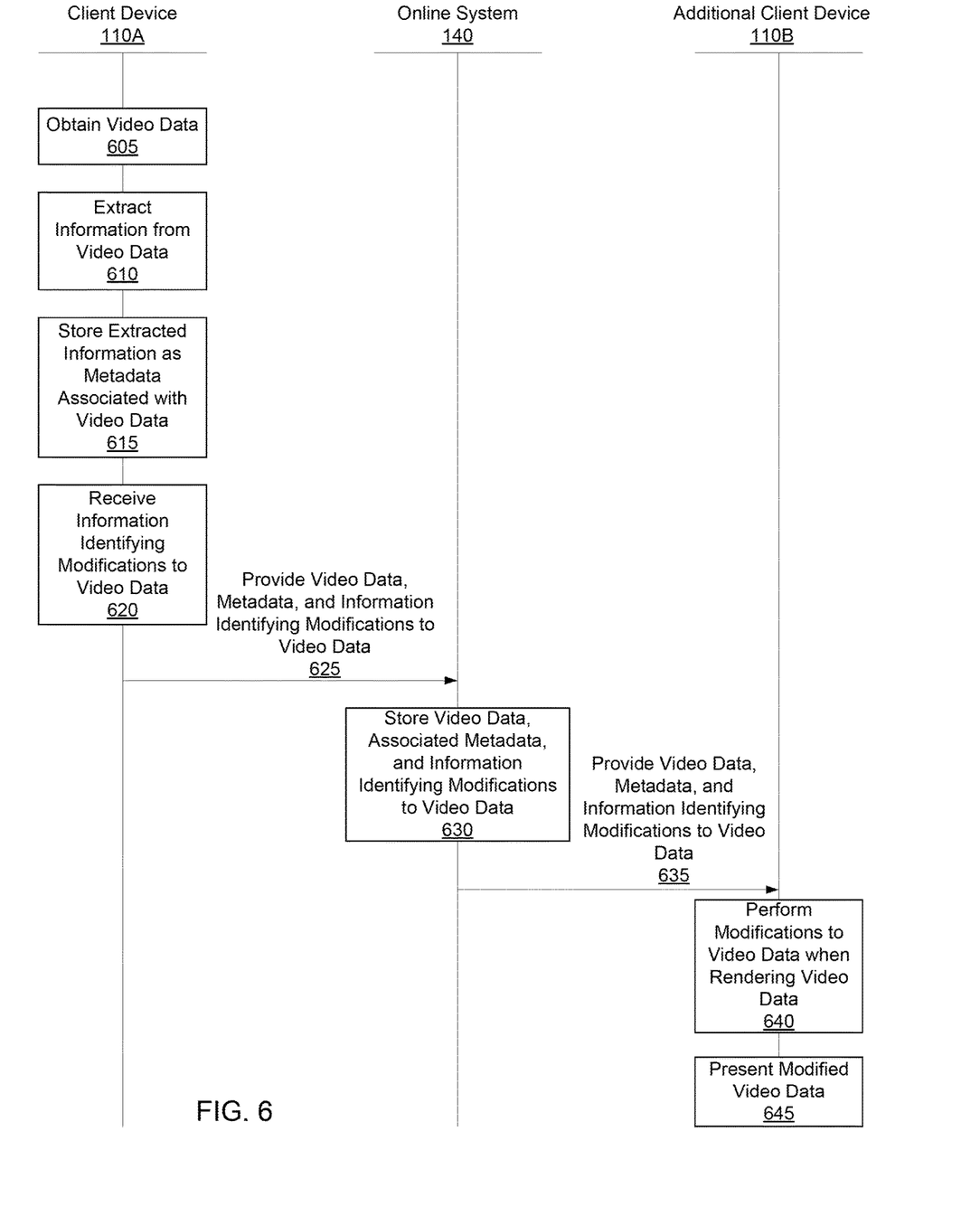
FIG. 6 is an interaction diagram of a method for providing video data obtained by a client device and modifications to the video data to another client device that performs the modifications and presents the modified video data, in accordance with an embodiment.

FIG. 6 is an interaction diagram of one embodiment of a method for providing video data obtained by a client device 110 and modifications to the video data to another client device 110 that performs the modifications and presents the modified video data. In other embodiments, the method may include different and/or additional steps than those shown in FIG. 6. Additionally, steps of the method may be performed in different orders than the order described in conjunction with FIG. 6 in various embodiments.

A client device 110A obtains 605 video data and extracts 610 information from the video data when the video data is obtained 605. As further described above in conjunction with FIG. 4, the video data may be captured by an image capture device 305 included in the client device 110A, received from another client device 110, received from a third party system 130, received from an online system 140, retrieved from a storage device included in the client device 110A, or obtained 605 from any other suitable source. While the client device 110A obtains 605 the video data, the client device 110A extracts 610 information from the video data. As further described above in conjunction with FIG. 4, the client device 110A applies one or more processes to the video data to extract any suitable information from the video data (e.g., objects, optical flow vectors, changes to one or more objects, locations within one or more frames of the video data of objects, etc.). The client device 110A stores 615 the extracted information as metadata associated with the video data. For example, if the extracted information includes objects detected in the captured video data, metadata stored 615 in association with the video data includes times within the video data where various objects, or identifiers of frames of the video data where the various objects, were detected along with identifiers of the detected objects; locations within various frames where objects were detected may also be included in the stored metadata.

Additionally, the client device 110A receives 620 information identifying one or more modifications to the video data and stores. For example, the client device 110A receives 620 an identifier of a filter to apply to the captured video data from a user along with identifiers of one or more portions (e.g., identifiers of frames, time intervals) of the captured video data to which the filter is applied. As another example, the client device 110A receives 620 text or image data to overlay on one or more portions of the captured data (e.g., identifiers of frames, time intervals) of the captured video data to where the text or image data is overlaid. The received information may identify objects detected from the captured video data over which text or image data is overlaid in some embodiments. As described above in conjunction with FIG. 4, the received information may identify one or more objects or characteristics of one or more portions of the video data and one or more modifications to perform to portions of the video data including the one or more objects or having the one or more characteristics.

The client device 110A provides 625 the video data, the metadata associated with the captured video data, and the information identifying the one or more modifications to the video data to the online system 140, which stores 630 the video data, the metadata associated with the video data, and the information identifying the one or more modifications to the video data. For example, the client device 110A provides 625 information identifying a user of the online system 140 associated with the client device 110A in association with the video data, with the metadata associated with the video data, and with the information identifying the one or more modifications the video data to the online system 140, which stores 630 the video data, associated metadata, and information identifying the one or more modifications to the video data in association with the user.

The online system 140 provides 635 the video data, the metadata associated with the video data, and the information identifying the one or more modifications to the video data to an additional client device 110B. In various embodiments, the additional client device 110B is associated with a user of the online system 140 provided 625 to the online system 140 along with the video data, the metadata associated with the video data, and the information identifying the one or more modifications to the video data. Alternatively, the online system 140 receives information identifying an additional user of the online system 140 from a user associated with the client device 110A, identifies an additional client device 110B associated with the additional user from information the online system 140 maintains for the additional user, and provides 635 the video data, the metadata associated with the video data, and the information identifying one or more modifications to the video data to the additional client device 110B.

When the additional client device 110A receives the video data, the metadata associated with the video data, and the information identifying one or more modifications to the video data, the additional client data uses the metadata to perform 640 one or more of the identified modifications the video data while rendering the video data and presents 645 the modified video data via a display device 325. Using the metadata associated with the video data to perform 640 one or more of the identified modifications while rendering the video data allows the additional client device 110B to reduce draw from a battery or other power supply when modifying the video data. As described above in conjunction with FIG. 4, extracting information from video data is computationally intensive, and using the metadata to perform 640 one or more of the modifications to the video data allows the additional client device 110B to leverage the metadata associated with the video data to modify the video data during rendering without again extracting information for performing the modifications from the video data after receiving the captured video data.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   obtaining video data at a client device;
   extracting information from the video data by the client device applying one or more processes to the video data when the video data is obtained at the client device, the extracted information including one or more objects detected in the video data;
   storing the extracted information as metadata associated with the video data;
   receiving information identifying one or more modifications to the video data;
   storing the received information identifying the one or more modifications to the video data in association with the video data and with the metadata;
   receiving an interaction with the client device identifying one or more additional modifications to the video data during presentation of the video data by the client device and identifying one or more time intervals of the video data for applying the one or more additional modifications to the video data, the identified one or more additional modifications comprising:
      identifying an object of the one or more detected objects in the video data; and
      identifying an image to overlay on the identified object;
   storing information about the one or more additional modifications to the video data and the one or more time intervals of the video data for applying the one or more additional modifications to the video data identified by the interaction received during presentation of the video data by the client device in association with the video data and with the metadata; and
   modifying the video data at the one or more time intervals based on the stored information about the one or more additional modifications to the video data and the stored information about the one or more time intervals of the video data by performing the one or more additional modifications to the video data when the one or more time intervals of the video data are rendered for presentation by a display device of the client device.

2. The method of claim 1, wherein the metadata associated with the video data identifies one or more portions of the video data including the one or more objects detected in the video data.

3. The method of claim 2, wherein at least one of the objects comprises a face.

4. The method of claim 2, further comprising:
   modifying a portion of the video data including an object during times when the portion of the video data including the object is rendered by the client device.

5. The method of claim 4, wherein modifying the portion of the video data including the object is based on the received information identifying the one or more modifications to the video data or the one or more additional modifications to the video data identified by the interaction received during presentation of the video data by the client device.

6. The method of claim 5, wherein the one or more modifications and the one or more additional modifications to the video data identify the portion of the video data including the object, and modifying the portion of the video data including the object further comprises:
 modifying the portion of the video data including the object based on one or more inputs received from the user of the client device during times when the portion of the video data including the object is rendered by the client device.

7. The method of claim 5, wherein the one or more modifications and the one or more additional modifications to the video data identify the portion of the video data including the object, and modifying the video data comprises:
 modifying the portion of the video data including the object based on information captured by one or more components of the client device during times when the portion of the video data including the object is rendered by the client device.

8. The method of claim 5, wherein modifying the portion of the video data including the object based on the received information further comprises:
 overlaying one or more images on the portion of the video data including the object and modifying audio data of the video data during the portion of the video data.

9. The method of claim 5, wherein modifying the portion of the video data including the object based on the received information further comprises:
 performing the one or more modifications or the one or more additional modifications to the portion of the video data including the object based on one or more characteristics of the portion of the video including the object.

10. The method of claim 1, further comprising:
 providing the video data and the metadata associated with the video data to an online system.

11. The method of 10, further comprising:
 providing the received information identifying the one or more modifications to the video data to the online system.

12. The method of 11, further comprising:
 providing the information identifying the one or more additional modifications to the video data identified by the interaction received during presentation of the video data by the client device to the online system.

13. The method of claim 10, wherein providing the video data and the metadata associated with the video data to the online system comprises:
 communicating an identifier of a user of the online system to the online system in association with the video data and the metadata associated with the video data.

14. The method of claim 1, wherein obtaining video data at the client device comprises:
 capturing the video data via an image capture device included in the client device.

15. The method of claim 1, wherein obtaining video data at the client device comprises:
 receiving the video data from another client device.

16. A computer program product comprising a non-transitory computer readable storage medium having instructions encoded thereon that, when executed by a processor, cause the processor to:
 obtain video data at a client device;
 extract information from the video data by the client device applying one or more processes to the video data when the video data is obtained at the client device, the extracted information including one or more objects detected in the video data;
 store the extracted information as metadata associated with the video data;
 receive information identifying one or more modifications to the video data;
 store the received information identifying the one or more modifications to the video data in association with the video data and with the metadata;
 receive an interaction with the client device identifying one or more additional modifications to the video data during presentation of the video data by the client device and identifying one or more time intervals of the video data for applying one or more additional modifications to the video data, the received interaction further, the identified one or more additional modifications comprising:
  identifying an object of the one or more detected objects in the video data; and
  identifying an image to overlay on the identified object;
 store the received information about the one or more additional modifications to the video data and the one or more time intervals of the video data for applying the one or more additional modifications to the video data identified by the interaction received during presentation of the video data by the client device in association with the video data and with the metadata; and
 modify the video data at the one or more time intervals based on the stored information about the one or more additional modifications to the video data and the stored information about the one or more time intervals of the video data by performing the one or more additional modifications to the video data when the one or more time intervals of the video data are rendered for presentation by a display device of the client device.

17. The computer program product of claim 16, the metadata associated with the video data identifies one or more portions of the video data including the one or more objects detected in the video data.

18. The computer program product of claim 17, wherein the non-transitory computer readable storage medium having instructions encoded thereon that, when executed by the processor, cause the processor to:
 modify a portion of the video data including an object during times when the portion of the video data including the object is rendered by the client device by applying the one or more modifications to the video data or the one or more additional modifications to the portion of the video data including the object.

19. The computer program product of claim 18, wherein the one or more modifications or the one or more additional modifications to the video data identify the portion of the video data including the object, and modifying the portion of the video data is based on information captured by one or more components of the client device during times when the portion of the video data including the object is rendered by the client device.

20. A method comprising:
receiving, at an online system, video data from a client device associated with a user of the online system;
receiving, at the online system, metadata associated with the video data by the client device, the metadata including information extracted from the video data by the client device when the client device obtained the video data, the extracted information including one or more objects detected in the video data;
receiving, at the online system, information from the client device identifying or more modifications to the video data in association with the video data and with the metadata;
receiving, at the online system, information identifying one or more additional modifications to the video data and identifying one or more time intervals of the video data for applying one or more additional modifications to the video data as identified by the client device from an interaction received by the client device during presentation of the video data by the client device in association with the video data and with the metadata, the identified one or more additional modifications comprising:
  identifying an object of the one or more detected objects in the video data; and
  identifying an image to overlay on the identified object;
storing the video data in association with the metadata, with the information from the client device identifying one or more modifications to the video data, and with the information about the one or more additional modifications to the video data and the one or more time intervals of the video data for applying the one or more additional modifications to the video data as identified by the client device from an interaction received by the client device during presentation of the video data by the client device; and
providing the video data, the metadata, the information from the client device identifying or more modifications to the video data, the information about the one or more additional modifications to the video data and the one or more time intervals of the video data for applying the one or more additional modifications to the video data as identified by the client device from an interaction received by the client device during presentation of the video data by the client device to an additional client device associated with an additional user of the online system; wherein the video data is modified at the one or more time intervals based on the received information about the one or more additional modifications to the video data and the received information about the one or more time intervals of the video data by performing the one or more additional modifications to the video data when the one or more time intervals of the video data are rendered for presentation by a display device of the additional client device.

* * * * *

UNITED STATES PATENT AND TRADEMARK OFFICE
CERTIFICATE OF CORRECTION

PATENT NO. : 10,977,847 B2
APPLICATION NO. : 16/383005
DATED : April 13, 2021
INVENTOR(S) : Hermes Germi Pique Corchs et al.

Page 1 of 1

It is certified that error appears in the above-identified patent and that said Letters Patent is hereby corrected as shown below:

In the Claims

In Column 21, Claim 11, Line 46, delete "method of" and insert -- method of claim --, therefor.

In Column 21, Claim 12, Line 50, delete "method of" and insert -- method of claim --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*